(No Model.)

J. O'FARRELL, Sr.
SPRING VEHICLE.

No. 263,205.  Patented Aug. 22, 1882.

WITNESSES:
Francis McArdle.
C. Sedgwick

INVENTOR:
J. O'Farrell Sr
BY Munn & Co
ATTORNEYS.

UNITED STATES PATENT OFFICE.

JOSEPH O'FARRELL, SR., OF MORRISON, ILLINOIS.

SPRING-VEHICLE.

SPECIFICATION forming part of Letters Patent No. 263,205, dated August 22, 1882.

Application filed January 11, 1882. (No model.)

*To all whom it may concern:*

Be it known that I, JOSEPH O'FARRELL, Sr., of Morrison, in the county of Whiteside and State of Illinois, have invented a new and useful Improvement in Buggies or other Carriages, of which the following is a full, clear, and exact description.

This invention relates to buggies and other similar wheeled vehicles; and it consists in certain novel arrangements and connections of the springs, axles, reach, and body of the vehicle, whereby lighter axles carrying an increased load may be used without springing, a fifth-wheel is dispensed with, the reach is relieved of strain and cannot be struck by the body, which may be hung lower than usual, and the springs have an equalizing action in their support of the body.

In the accompanying drawings, forming part of this specification, similar letters of reference indicate corresponding parts in all the figures.

Figure 1:
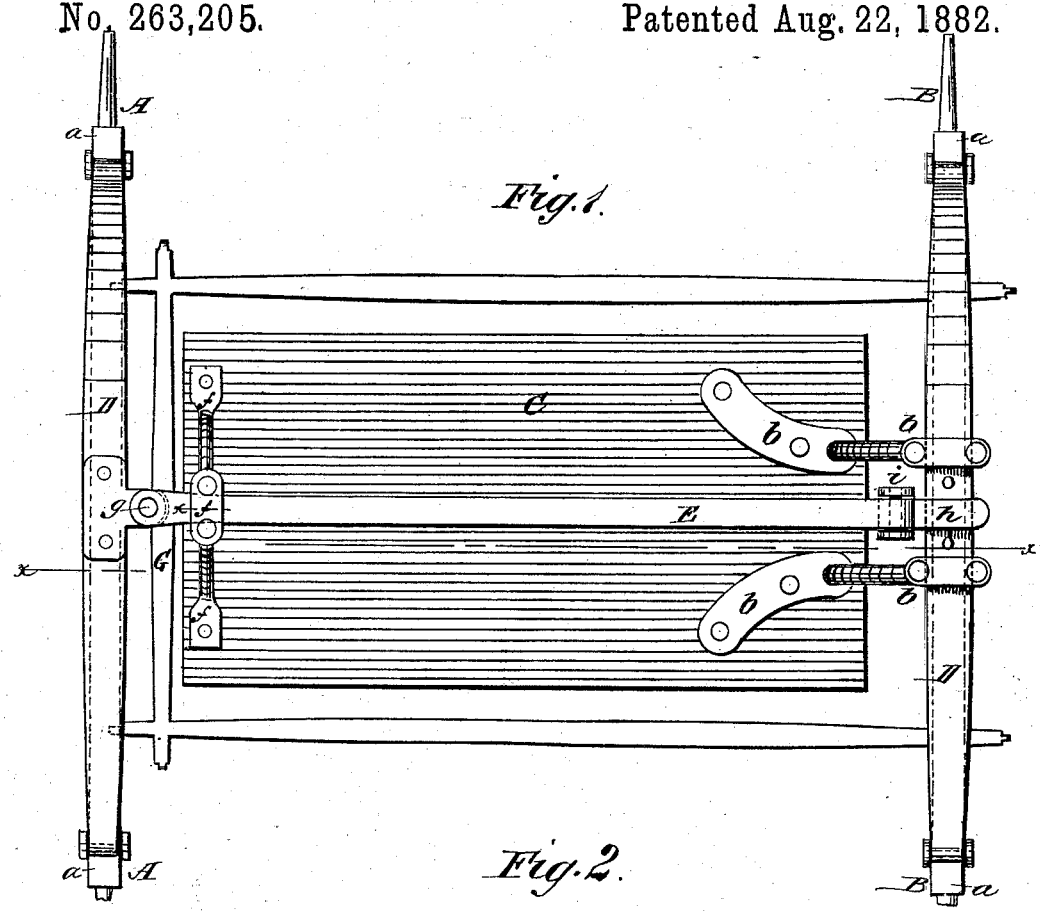
Figure 2:
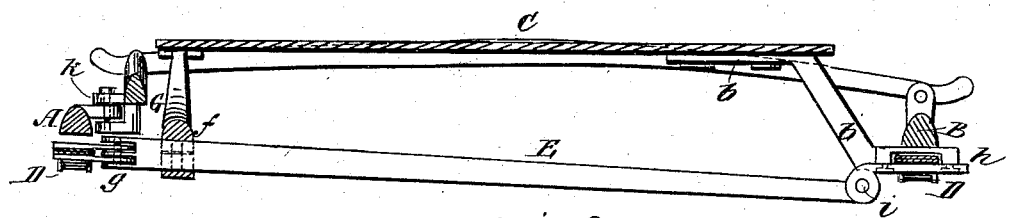
Figure 3:
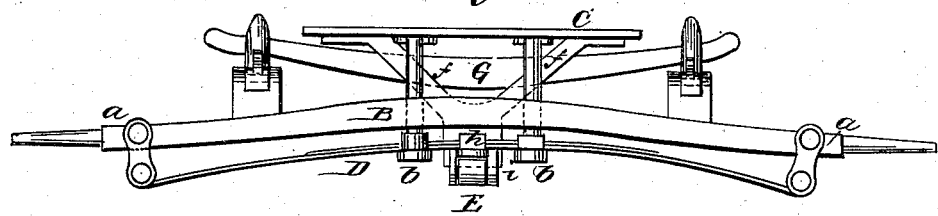

Figure 1 represents an inverted plan of the bottom of a buggy - body, together with the frame of the running-gear, including the axles, reach, springs, and other attachments. Fig. 2 is a longitudinal vertical section of the same on the line $x\ x$ in Fig. 1, and Fig. 3 is a rear view thereof.

A is the front axle, and B the rear one, of the vehicle. C is its body-bottom, and D D are the springs. Said springs, which may be of any suitable construction or shape, are arranged beneath the axles and in line with them, and extend nearly the whole length of the axles, in order that they may be hung at their ends to the axles near their collars $a\ a$, or in proximity to the hubs of the wheels. This arrangement of the springs D D removes weight from the centers of the axles and allows of lighter axles than usual (although carrying a heavier load) being used without springing. The bottom of the body C is connected to the back spring, D, by two loops, $b\ b$, on opposite sides of the reach E, and is connected in front by a single loop, $f$, attached to the reach, which latter is attached at its forward end by a joint, $g$, having a vertical axis, to the front spring, D, and at its rear end by clips $h$, connected by a joint, $i$, on the inside, and which has a horizontal axis to the back spring, D. The joint $g$ is back of the front axle, and the latter, which has its joint $k$ connecting it with the frame of the running-gear in the same plane longitudinally as the joint $g$, is preferably arranged in advance of the head-block G. These front joints act in place of a fifth-wheel, while the back joint, $i$, assists in removing strains from the reach E, and said reach works with the body of the vehicle, thereby allowing carriages to be built as low as desired without risk of striking the reach; and it is to such low work that the arrangement of the front axle in advance of the head-block is especially applicable. The jointed connection of the reach E with the front and back springs, D D, as described, adapts it to irregularities of the road, prevents strain, and, as hereinbefore observed, dispenses with a fifth-wheel, which would be in the way of the body of the vehicle when working down. The double-jointed connection of the front axle at $g\ k$ also reduces friction and rattle.

Although the construction as described admits of the body of the vehicle being hung much lower than usual, which is greatly to be desired, said body is not restricted from being hung as high as by any other construction, and there is no possibility of the body striking the reach, no matter how close these two parts may be to one another; or the body might be placed on the reach without detriment, as the body, reach, and springs all work together, and the springs have an equalizing action in their support of the body.

Having thus fully described my invention, I claim as new and desire to secure by Letters Patent—

1. The combination, with the springs D, arranged under the axles, of the reach E, hinged to the said springs and connected at its forward end to the body C, substantially as and for the purpose set forth.

2. The combination, with the springs D D, which support the body of the vehicle, of the reach E, connected with the front spring by a joint, $g$, having a vertical axis, and with the back spring by a joint, $i$, having a horizontal axis, substantially as described.

3. The combination, with the springs D D and the reach E, jointedly attached to said springs, of the body of the vehicle connected in its rear to the back spring and in front to the reach, whereby the body, springs, and reach all work in unison, essentially as specified.

4. The combination, with the front axle, A, arranged in front of the head-block and connected by the joint $k$ to the same, of the front spring, D, arranged under the said axle and connected by joint $g$ to the reach E, substantially as and for the purpose set forth.

5. The combination, with the axles A B, of the subjacent springs D D, connected with the axles near their ends on which the hubs of the wheels turn, the reach E, connected by joints $g$ and $i$ with said springs, and the body C, connected by a loop, $f$, in front to the reach, and at its back end by loops $b\ b$ to the back spring, essentially as herein set forth.

JOSEPH O'FARRELL, Sr.

Witnesses:
JAS. O'FARRELL,
GEORGE CLARK.